INVENTOR
HOWELL R. JARVIS
BY HIS ATTORNEYS
HARRIS, KIECH, RUSSELL & KERN

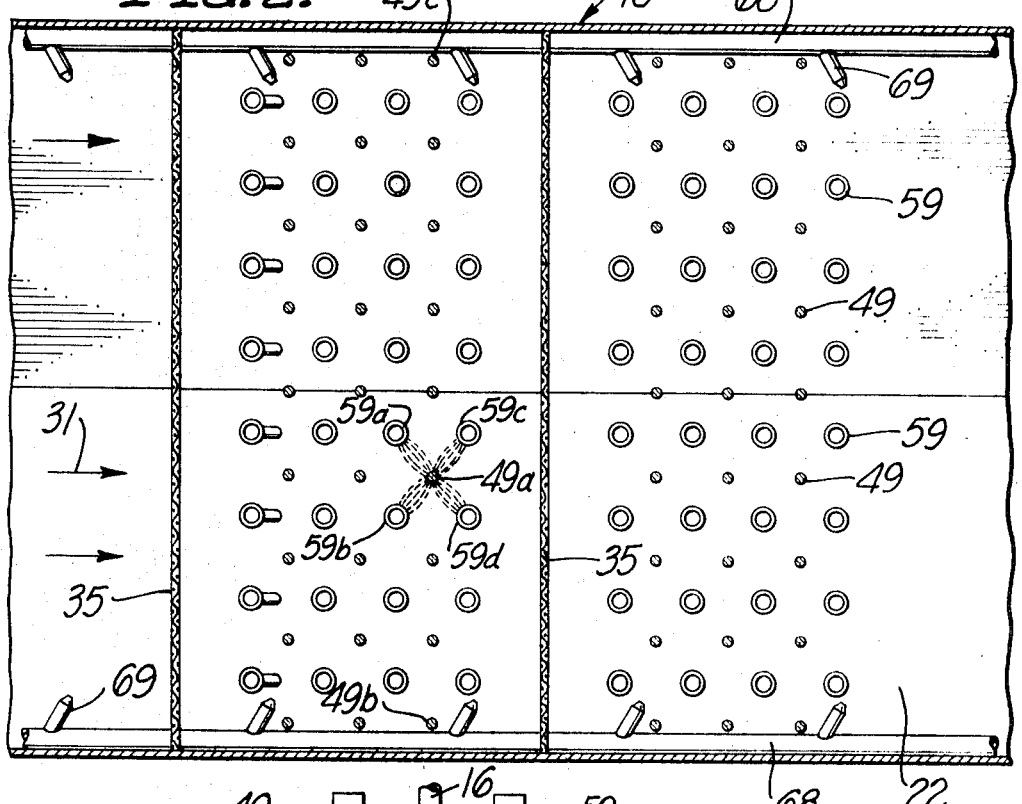
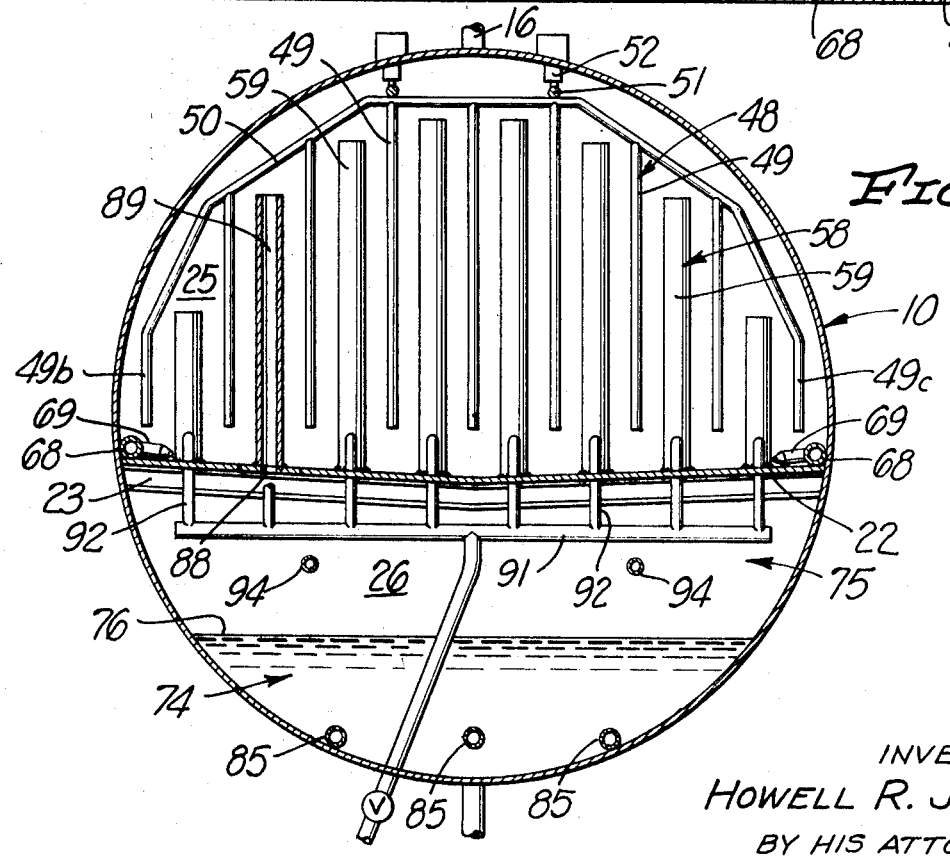

United States Patent Office 3,592,756
Patented July 13, 1971

3,592,756
EMULSION TREATER
Howell R. Jarvis, Houston, Tex., assignor to
Petrolite Corporation, St. Louis, Mo.
Filed Mar. 15, 1968, Ser. No. 713,424
Int. Cl. C10g 33/02
U.S. Cl. 204—302                        20 Claims

ABSTRACT OF THE DISCLOSURE

Emulsion is treated and partially separated during longitudinal flow above a baffle in a long horizontal container, with additional separation occurring during return flow beneath the baffle. The emulsion may be electrically treated while flowing above the baffle, as by flow between depending and upstanding elongated electrode members. Provision is made for treating any sludge that forms. The emulsion treater is particularly applicable to treatment of crude oils and the desalting thereof.

---

Figure 1:
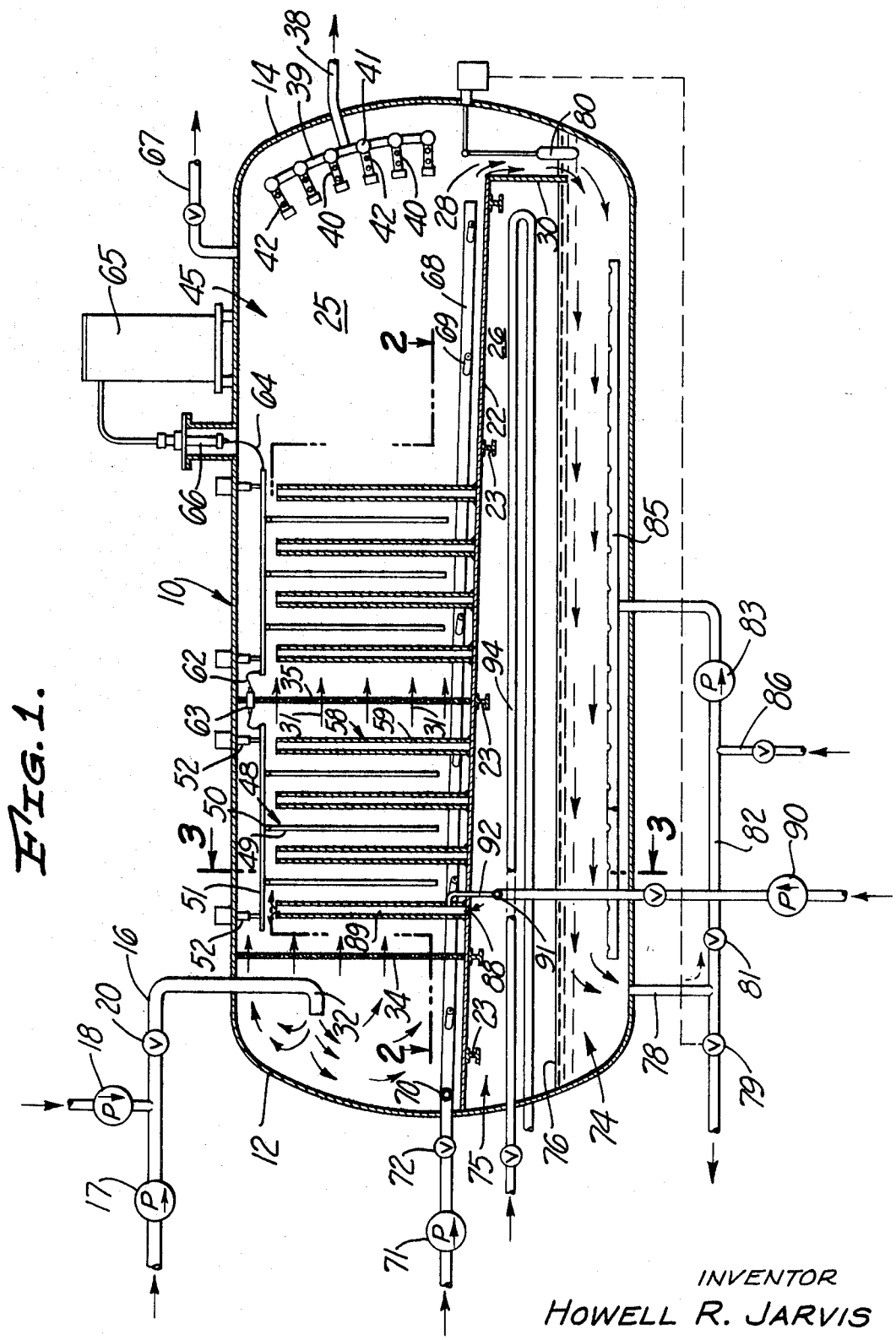

This invention relates to an emulsion treater useful in the dehydration or desalting of crude petroleum oils although it can be used in the resolution of other emulsions, which term is herein used as including dispersions. More particularly the invention relates to treatment during flow of the emulsion through a horizontal container of a horizontal length that is greater than its height.

Most of the prior electric treaters provide for moving emulsion upward into high-voltage electric fields that coalesce the dispersed droplets, usually brine, into larger droplets or masses of sufficient size to gravitate from the oil. In such systems treatment must continue until the coalesced masses are of sufficient size to gravitate through or counterflow the rising emulsion. This places limitations on the rate of treatment.

In a few instances horizontal treaters have been proposed with treatment occurring between vertical foraminous electrodes as the emulsion flows therethrough, see for example Turner U.S. Pat. No. 3,148,133. Such treaters are compartmented to provide successive treatment in compartments or zones arranged longitudinally of the vessel. These and other horizontal electric treaters suffer from the defect that the electrically treated emulsion constituents do not separate adequately at high throughput rates.

It is an object of the present invention to provide an electric treater in which the emulsion is electrically treated during longitudinal flow along the upper zone of a horizontal container above a generally horizontal baffle therein and in which at least part of the emulsion constituents separate during a reverse flow in a lower zone of the container below the baffle.

Another object is to provide an emulsion treater in which there is an initial separation of the emulsion in the upper zone, with the water and a small portion of the oil dropping to the lower zone for further separation. The mixture of oil and water dropping to the lower zone is permitted to separate by gravity during tranquil flow toward the entrance end of the container. This often produces a body of separated water in the bottom of the container and a layer of sludge theerabove but below the baffle.

The suldge in such a sludge layer is a concentrated mixture of oil and water that may not readily separate during the return flow. It is an object of the invention to recirculate such sludge upwardly through the baffle and into the upper zone to aid in its resolution. Another object of the invention is to introduce a chemical demulsifying agent into the rising stream of sludge to aid in its resolution. A further object of the inveintion is to collect the sludge in the highest portion of the lower zone from which it is moved upward through the baffle and into the upper zone.

It is an object of the invention in its preferred embodiment to incline this baffle slightly in a downward direction away from the entrance end of the container and toward the far end thereof. This provides an upper treating zone of progressively larger cross-section in a direction away from the entrance end of the container and a lower settling zone of progressively larger cross-section toward such end. Such slight inclination aids in the recirculation of the sludge, permits separation in the upper zone to take place as the emulsion moves forward at progressively lower velocity during flow through the upper zone, aids in carrying all of the emulsion constituents to the far end of the vessel and serves other desirable functions.

In the dehydration or desalting of crude oil emulsions it is found that the small amount of solids often contained therein will tend to settle and coat the baffle. It is an object of the invention to provide for jet washing the upper surface of the baffle either intermittently or during continued operation of the treater.

Another object of the invention is to provide for superior electric treatment of an emulsion by flowing same longitudinally of the container through a forest of depending and upstanding elongated electrode members between which electric fields are established. It is an object to arrange these electrode members in oppositely-poled sets and to dispose the electrode members of one set substantially centrally between the electrode members of the preceding and succeeding sets. A further object is to treat the emulsion during flow through sets of electrodes made up of vertical elongated members, usually rods or pipes with cylindrical surfaces. The field between oppositely-poled rods or pipes is more concentrated adjacent these electrodes than at intervening positions along a line or plane joining such electrodes. This is conductive to more intensive treatment in the immediate vicinity of the electrodes. By making these electrodes vertical the coalesced material can be channeled downward in the zones immediately around the electrodes thus facilitating the initial separation that is desired in the treating zone.

Further objects and advantages of the invention will be apparent to those skilled in the art from the following description of an exemplary embodiment of the invention in which electrodes are employed to accelerate treatment in the upper zone. Many features of the invention are useful in the absence of these electrodes or when they are not energized, in which event treatment of the emulsion in the upper zone is by the application of gravitational forces.

The drawings illustrate a preferred embodiment of an electric treater, FIG. 1 being a vertical sectional view, FIG. 2 being a fragmentary view taken along the line 2—2 of FIG. 1 and FIG. 3 being a cross-sectional view taken along the line 3—3 of FIG. 1.

As shown in FIG. 1, the treater is exemplified as providing a horizontal container 10 of a horizontal length significantly greater than its height. This container can be of generally cylindrical shape but can be of a cross-sectional shape other than circular if desired. The container is shown as including a curved head 12 at the entrance end and a curved head 14 at the far end. An inlet pipe 16 enters the container at the entrance end and may receive crude oil emulsion under the pressure of a pump 17. In a desalting operation a pump 18 may pump a small quantity of fresh water into the pipe 16 to be mixed with the incoming crude oil in a valve or other mixer 20, all as well known in the art.

A generally horizontal baffle 22, flat or slightly dished as shown, is mounted on transverse supports 23 near the horizontal axis of the container 10. The edges of this baffle are closely adjacent to the inner wall of the container at its entrance end and along its sides with such edges preferably being in fluid-tight relation with the container wall. The baffle 22 divides the interior of the container into an upper elongated treating zone 25 and a lower elongated settling zone 26. For reasons to be outlined, this baffle preferably slopes slightly downward between the entrance end of the container and the far end thereof.

Means is provided at the far end of the baffle 22 for openly interconnecting the far ends of the upper and lower zones, providing for downward fluid flow of separated material from the far end of the treating zone to the far end of the settling zone. This interconnecting means may be any passage at the far end of the upper and lower zones but preferably extends a distance downward from the baffle for a purpose to be described. As shown, the far end of the baffle 22 terminates short of the head 14 to provide an interconnecting passage 28. In the preferred embodiment a plate member 30 is secured to the far end of the baffle and depends into the lower zone 26.

It is desirable that a large stream of the incoming emulsion should fill the elongated treating zone 25 with all portions advancing therealong in the direction of arrows 31 with substantially equal velocity. Some separation of the emulsion takes place during this flow whether by electric action or otherwise, as will be described. Several features of the invention contribute to this type of flow. For example, the lower end of the inlet pipe 16 may have a portion 32 turned toward the head 12 to obtain a spreading action as the flow reverses in direction upon contacting the head. The emulsion then flows through a foraminous element 34 traversing the upper zone 25 which tends in some measure to make the flow uniform by inducing a small pressure drop. If desired one or more other foraminous members 35 may traverse the upper zone at more advanced positions to serve a similar purpose. Uniform flow is also induced by withdrawing treated oil from the far end of the upper zone at a plurality of positions distributed throughout the cross-section thereof. In this connection the preferred embodiment of the invention employs a treated oil pipe 38 connected to an internal manifold 39 with end-closed nipples 40 connected thereto and to branch pipes 41 extending therefrom, all to dispose the nipples in the pattern tending to induce uniform flow in the upper zone. Each of the nipples 40 may provide a plurality of side orifices 42 at different peripheral positions and through which the treated oil flows to the treated oil pipe 38.

Electric treatment of the emulsion is effected between oppositely-poled foraminous electrodes arranged alternately throughout much of the length of the upper treating zone 25 ahead of an end zone 45 thereof. Each foraminous electrode is preferably made up of vertically elongated electrodes arranged in a set. For example, alternate electrode sets 48 of the same polarity may include elongated electrodes 49 depending from an arched frame 50 connected to longitudinal support members 51 that are supported from the top of the container by means of insulators 52. The elongated electrodes 49 may be small rods of differing length with their lower ends terminating a uniform distance above the baffle 22. Intervening electrode sets 58 are shown as comprising upstanding elongated electrodes 59 having their lower ends connected to and supported by the baffle 22, these electrodes being of different lengths if disposed in a cylindrical container so that their upper ends terminate a substantially uniform distance therefrom. The upstanding elongated electrodes 59 are spaced laterally from each other in corresponding vertical planes. Likewise the depending elongated electrodes 49 are spaced laterally from each other in vertical planes that are preferably midway between the preceding and succeeding electrode sets 58. Various other electrode arrangements can be used but the illustrated pattern of electrodes is particularly suited to the invention.

This pattern of electrodes is best shown in FIG. 2. The upstanding elongated electrodes therein designated 59a and 59b are a part of one electrode set while those designated 59c and 59d are a part of the next set. Preferably the upstanding electrodes of such adjacent sets are substantially in alignment axially of the container. The upstanding electrodes 59a, 59b, 59c, and 59d are at the corners of a horizontal-plane rectangle and one of the depending elongated electrodes, here designated 49a, is substantially centered at the intersection of diagonals of such rectangle. This type of pattern repeats throughout the upper treating zone 25. At all portions near the center of the pattern one of the depending elongated electrodes 49 can be considered as centered with respect to the four nearby upstanding electrodes 59 or each upstanding electrode 59 can be considered as substantially centered with respect to four nearby depending elongated electrodes 49.

If the adjacent electrode sets 48 and 58 are electrically energized and oppositely poled the field patterns between the electrodes are suggested by the dotted lines in FIG. 2. For example there will be a strong electric field between the depending electrode 49a and the upstanding electrode 59c and this field will be more concentrated near the electrode surfaces than at some position therebetween. In addition if the electrode 49a is of smaller diameter than the electrode 59c the field therebetween will be more concentrated adjacent the former than adjacent the latter. Such a size relationship is preferred but the electrodes of different sets may be of substantially the same diameter if this is desired.

It will be apparent that emulsion flowing in the direction of the arrows 31 must flow repeatedly through such fields and that no portion of the emulsion can bypass the electrode sets without being subjected to repeated electric treatment. In this latter connection it is preferred that the outermost electrodes of each set of depending electrodes, e.g. those indicated by the numerals 49b and 49c in FIG. 2, should be energized or high-voltage electrodes and should be spaced from the walls of the container a distance that is practically the same as the normal distance between each electrode 49a and its adjacent electrodes 59. The legs of the arched frame 50 (FIG. 3) may constitute such outermost depending electrodes. Successive fields will be likewise established between the arched frames 50 and the interior of the container with such fields acting on any emulsion that does not flow through the forest of upstanding and depending electrodes. Likewise there will be electric fields between the lower ends of the depending electrodes 49 and the top of the baffle 22 serving a similar treating function.

It is preferable to arrange the electrode sets in groups, one beyond each foraminous element such as 34 and 35. For example one group may comprise several electrode sets 48, 58 positioned between the foraminous elements 34 and 35. A similar group may be arranged downstream of the foraminous element 35. The longitudinal support members 51 may be electrically interconnected by a conductor 62 passing through an insulator 63 mounted in the foraminous element 35 or the two groups of electrode sets may be separately energized. As shown, all of the depending electrodes 49 of the two groups are energized through a high-voltage lead 64 connected to a high-voltage transformer 65 through a conventional inlet bushing 66. If treatment with unidirectional electric fields is desired a high-voltage power pack may be substituted for the transformer 65. One terminal of the transformer or power pack will be grounded to the container 10 and will thus be connected to the upstanding elongated electrodes 59 through the baffle 22.

As the emulsion flows through the upper zone 25 above the baffle the dispersed-phase droplets thereof will settle and this settling will be augmented by any contact of the droplets that will coalesce them particularly if this contact induces progressive coalescence into sizable masses that settle readily from the oil phase of the emulsion. Such contact of droplets and coalescence thereof can be random or the probability of contact can be increased by mild turbulence of the emulsion during its flow along the upper zone 25. Coalescence can be augmented by the presence of a chemical demulsifying agent in the emulsion but the most powerful force augmenting or inducing contact and coalescence is a high-voltage electric field. The electrode arrangement illustrated is of particular value because some of the electrical coalescence will occur selectively in the higher-intensity zones adjacent the elongated electrodes 49, 59 and the coalesced masses will channel downward along these electrodes to the top surface of the baffle 22 and thus be removed from the main stream. However some of the coalescence will take place in situ in the oil in the interelectrode spaces and these masses will tend to gravitate through the oil to the baffle 22 as the flow progresses.

The end zone 45 provides an additional space for the dispersed droplets or the coalesced masses to separate, it being clear that all of the separated dispersed-phase or heavier-phase liquid settling on the baffle 22 will drain to the lower end thereof and drop through the passage 28 to the lower settling zone 26 as indicated by the arrows of FIG. 1. By the time the stream reaches the far end of the container the oil will have been dehydrated or desalted to the extent of containing no more than a small amount of residual dispersed material. This treated oil is withdrawn from the container through the manifold 39 and the pipe 38. Any gas separating from the emulsion can be withdrawn through a valved gas-withdrawal pipe 67.

Natural crude oil emulsions or emulsions synthesized in a desalting operation often carry a small amount of solids. As a result of gravity, aided if desired by the electric field, such solids tend to settle at the top of the baffle 22, sometimes to the extent of building up a layer of solids thereon that tends to cause short-circuiting between the bottoms of the depending electrodes 49 and the layer of solids. If desired, the invention may incorporate jet means for washing such solids from the top of the baffle 22 and/or accelerating the movement of water or other dispersed-phase material that has settled toward the baffle. As shown, a closed-ended wash pipe 68 may be mounted within the container near one or both sides thereof and may provide baffle-washing nozzles 69 directed along the upper surface of the baffle 22. These nozzles 69 are preferably directed toward the vertical midplane of the container but are inclined toward the far end thereof to wash the solids toward the lower end of the baffle 22. In the preferred embodiment a U-shaped pipe arrangement is used with the pipes 68 constituting the legs and with a pipe 70 constituting a bight fed with a wash liquid under pressure induced by a pump 71 with the flow being controlled by a valve 72. The wash arrangement is preferably used intermittently during periods of de-energization of the electrodes but it can be employed intermittently or continuously during periods of energization.

In practically all instances the settled material dropping downward in the passage 28 will still carry some residual oil. Commonly this material will be an oil-in-water sysetem but with some practices of the invention it may be a water-in-oil system or a system in which oil-in-water droplets may be dispersed in an oil phase. In any of these events significant further separation of water and oil will occur during the return flow in the lower settling zone 26 toward the entrance end of the container. The oil-water mixture tends to separate gravitationally to form a body of water 74 in the bottom of the container and a layer of sluge 75 thereabove but below the baffle 22. There will be an interfacial zone or interface 76 therebetween. If the sludge in the layer is largely an oil-in-water system the interfacial zone 76 will be a zone of transition between oil-continuous and water-continuous materials but there will usually be some separated water therebelow, forming the body of separated water 74. Water from the body of water 74 may be withdrawn through a pipe 78 as controlled by a valve 79 which is in turn controlled by a float 80 in the passage 28 or by any other level-control means to maintain the position of the interface or interfacial zone 76 near a predetermined level, desirably slightly above the bottom edge of the plate member 30.

It is to be noted that if the oil-water system flowing downward from the upper zone through the passage 28 is caused to enter the body of separated water 74 some water washing will result and some of the water of the oil-water system will be removed. Even of greater importance, the oil-water system will be subject to gravitational separation for a considerable time during the long and slow return flow below the baffle toward the entrance end of the container. This type of separation is conducive to clean separation with the body of separated water containing little or no residual oil or sludge. As oil droplets rise through the water to the sludge layer they tend to contact and sweep from the water other oil droplets that may not rise so readily. However in those instances where residual oil or sludge still tends to be retained in the water, further actions can be induced to clarify the body of water 74. For this purpose a portion of the effluent water may be recirculated from the pipe 78 by opening a valve 81 in a pipe 82 leading to a pump 83 which discharges into one or more perforated pipes 85 which discharge the recirculated water upward in the body of water in a manner tending to sweep droplets of oil or sludge therefrom and toward the layer of sludge 75. If desired, water from a separate source or a chemical demulsifying agent can be introduced into the pipe 82 through a valved pipe 86 to aid this action.

The invention is also concerned with disposal of the sludge in the layer of sludge 75. This is particularly true if the layer 75 tends to deepen during continued operation of the equipment, which deepening may tend to contaminate the water body 74 with oil. The invention proposes to conduct sludge upward from the layer 75 thereof through the baffle and into some portion of the upper zone 25 where its resolution is there aided, as by the action of an electric field and/or by other actions. Preferably the sludge is returned to the upper zone 25 at some position that is closer to the entrance end of the container than the far end thereof. If electric fields are used in the upper zone 25 the sludge will desirably be returned at a position to be acted on by electric fields downstream of such position, e.g. at a position between the entrance end of the container and the longitudinal midpoint thereof. The sludge will desirably be withdrawn from the upper portion of the sludge layer, preferably from practically the highest portion of the lower zone 26 below the sloping baffle 22.

The preferred means for conducting sludge upward in this manner is best shown in FIGS. 1 and 3 as including a lateral series of openings 88 in the baffle 22. The upstanding elongated electrodes 59 of the first set 58 are preferably tubes with their interiors aligned with the openings 88, forming a return passage 89 through which the sludge may rise and discharge from at least one orifice of each tube, e.g. from one or more side orifices or from the orifice formed by the open upper end of the tube. The latter arrangement is preferred. The remaining upstanding elongated electrodes 59 of succeeding electrode sets 58 may similarly be formed of tubes and some of these can be employed as sludge conduits. However it is preferred that such remaining upstanding electrodes be closed at their lower ends by the supporting baffle 22.

It is within the scope of the invention to mix a small quantity of demulsifying agent with the sludge rising in the passages 89 to aid its resolution by chemical means or to aid electric resolution thereof. In this connection a pump 90 may force a small amount of chemical demulsifying agent into a manifold 91 equipped with branch pipes 92 leading respectively to the passages 89. The demulsifying agent will mingle with the rising sludge and the resulting chemically-modified sludge will discharge from the open upper ends of the passages 89.

The upward flow of sludge in the passages 89 is the result of a number of actions any one or more of which can be employed depending upon whether sludge retreatment is desired and the amount of sludge to be recirculated. For example, the small slope of the baffle 22 aids in this recirculation because the flow rate in the upper zone is higher at positions toward the entrance end than toward the far end, resulting in a minutely lower pressure in the vicinity of the passages 89 of the first set of upstanding electrodes 59. Also the return flow in the lower zone is at lower velocity (higher pressure) at the entrance end near the passages 89 than at the far end where the return velocity is higher and the pressure is slightly lower. As the sludge is of lower density than the water in the body 74, the slight inclination of the baffle 22 serves also to move the sludge leftward toward the entrance end so that the lower ends of the passages 89 open on sludge that has risen to or been floated leftward to essentially the highest point of the lower zone 26.

Upward flow of sludge can also be induced by thermal means. In this connection a U-shaped tube heater 94 can be used to heat the sludge layer to a temperature higher than the emulsion flowing rightward above the baffle Such heating of the sludge not only aids in its resolution but lowers the density of the sludge entering the lower ends of the passages 89 causing it to rise therein.

Likewise any residual gas that separates in the lower zones 26 rises to a position below the baffle and moves leftward, carrying some of the sludge therewith, toward the downwardly-open passages 89. This gas mingles with the sludge in these passages and tends to cause upward movement thereof by the well-known gas lift effect. This effect can be augmented by deliberately supplying external gas to the lower zone 26 or to the stream of chemical demulsifying agent pumped to the passages 89.

The demulsifying agent itself can be employed to aid in inducing upward flow of sludge in the passages 89. This can be done by directing the demulsifying agent centrally upward in each tube, by control of the density of the demulsifying agent or the temperature thereof relative to the sludge, or by control of other characteristics of the demulsifying agent employed.

Finally, the emulsion stream flowing laterally over the open tops of the upstanding electrodes 59 tends to aspirate sludge from the passages 89 adn induce upward movement therein. While this and other actions inducing upward flow of sludge are sometimes small, the combined effects can cause significant volumes of sludge to be recirculated. As a result sludge is not permitted to accumulate progressively and an excellent degree of separation of the emulsion constituents is achieved.

Various changes and modifications can be made without departing from the spirit of the invention as defined in the appended claims.

I claim:
1. An emulsion treater including in combination:
 (a) a horizontal container of a horizontal length greater than its height;
 (b) a generally horizontal baffle near the horizontal axis of the container dividing the interior thereof into an upper elongated treating zone and a lower elongated settling zone, one end of said baffle being closely adjacent said one end of said container and the other end of said baffle providing vertical flow means openly interconnecting the other ends of said zones and providing for unobstructed downward flow of heavier liquid from said treating zone into said settling zone wherein the heavier liquid collects in a body;
 (c) an inlet pipe at said one end of said container in fluid communication with the corresponding end of said upper treating zone;
 (d) means for delivering the emulsion comprising lighter and heavier liquids to be treated to said inlet pipe;
 (e) an outlet pipe for separated heavier liquid opening on said lower settling zone spaced from said other end and defining a first flow path for heavier liquid from said inlet pipe to said outlet pipe through said uper zone, said vertical flow means and said lower zone;
 (f) control means associaed with said outlet pipe to maintain said body of heavier liquid spaced below said baffle; and
 (g) means for withdrawing treated lighter liquid from said other end of said upper elongated treating zone and defining a second flow path for treated lighter liquid through said upper zone from said inlet pipe to said means for withdrawing;
 (h) with said baffle, vertical flow means and control means coacting to pass unresolved emulsion containing lighter and heavier liquids and no substantial amounts of treated lighter liquid, from said vertical flow means, horizontally in a reverse direction within said lower elongated settling zone in the space between said baffle and the body of heavier liquid whereby further gravitational separation of said lighter and heavier liquids is promoted in said lower settling zone.

2. An emulsion treater as defined in claim 1 including electrodes in said upper elongated treating zone spaced along the length thereof in the path of flow of said emulsion;
 means for establishing high voltage electric fields between said electrodes; and
 means located between said one end of said container and the electrode closest to said other end of said container for conducting sludge upward from a layer thereof in said lower zone through said baffle into said upper zone to be acted upon by the electric fields between electrodes that are downstream of such location,
 with the fluid flowing in said lower zone toward said one end of said container comprising an oil-water mixture separating gravitationally during such flow to form a body of water in the bottom of said container and a layer of sludge thereabove but below said baffle.

3. An emulsion treater as defined in claim 1 in which said control means includes an outlet valve in said outlet pipe, a level sensing element in said vertical flow means, and means for actuating said valve as a function of said level sensing element output.

4. An emulsion treater as defined in claim 1 including means closer to said one end of said container than said other end thereof for conducting sludge upward from said layer thereof through said baffle into said upper zone with the fluid flowing in said lower zone toward said one end of said container comprising an oil-water mixture separating gravitationally during such flow to form a body of water in the bottom of said container and a layer of sludge thereabove but below said baffle.

5. An emulsion treater as defined in claim 4 including means for introducing a chemical demulsifying agent into the sludge moving upward through said baffle.

6. An emulsion treater including in combination:
 a horizontal container of a horizontal length greater than its height;
 means for establishing a fluid flow essentially from one end of said container horizontally in a first direction to the other end through an upper elongated treating zone therein, with part of such flow returning horizontally in a reverse direction through a lower elongated settling zone with gravitational separation being effected in each of said upper and lower elongated settling zones, the returned part of said flow comprising material separating from the fluid flowing in said upper elongated treating zone, said flow-establishing means including (a) a generally horizontal baffle near the horizontal axis of the container dividing the interior thereof into said upper and lower zones, one end of said baffle being closely adjacent said one end of said container and the other end of said baffle providing means openly interconnecting the other ends of said zones and providing for downward flow of said part of said flow from the other end of said treating zone to the other end of said settling zone, (b) an inlet pipe at said one end of said container communicating with the corresponding end of said upper zone, (c) means for delivering the emulsion to be treated to said inlet pipe, (d) an outlet pipe for separated liquid opening on said lower zone spaced from said other end; and (e) means for withdrawing treated oil from said other end of said upper elongated treating zone;

(f) upright foraminous electrodes in successive vertical planes in said upper elongated treating zone spaced along the length thereof in the path of flow of said emulsion; and (g) means for establishing high-voltage electric fields between such electrodes.

7. An emulsion treater as defined in claim 6 in which one of said electrodes includes upstanding tubular electrode members having lower ends connected to said baffle with the interior of each tubular electrode forming a passage interconnecting the upper and lower zones.

8. An emulsion treated as defined in claim 6 in which alternate electrodes comprise depending vertically-elongated electrode members spaced laterally from each other in corresponding vertical planes, and in which the intervening electrodes comprise upstanding vertically-elongated electrode members spaced laterally from each other in corresponding intervening vertical planes, said upstanding electrode members having lower ends connected to and supported by said baffle.

9. An emulsion treated as defined in claim 8 in which three succesive electrodes comprise two electrodes with their vertically-elongated electrode members substantially in alignment axially of said container with laterally-spaced elongated electrode members of each of these two electrodes being at the corners of a horizontal-plane rectangle, the third electrode being midway between said two electrodes with one of its vertically-elongated electrode elements substantially centered at the intersection of diagonals of said rectangle.

10. An emulsion treater as defined in claim 8 in which each of the alternate electrodes comprises an arched frame with rod electrodes depending therefrom and having lower ends terminating above said baffle, means for electrically interconnecting such frames, and means for electrically insulating such frames and rod electrodes from said container.

11. An emulsion treater as defined in claim 10 in which each of the intervening electrodes includes upstanding elongated electrode members of larger cross-sectional size than said rods.

12. An emulsion treater including in combination:
a horizontal container of a horizontal length greater than its height; and
means for establishing a fluid flow essentially from one end of said container horizontally in a first direction to the other end through an upper elongated treating zone therein, with part of such flow returning horizontally in a reverse direction through a lower elongated settling zone with gravitational separation being effected in each of said upper and lower elongated settling zones, the returned part of said flow comprising material separating from the fluid flowing in said upper elongated treating zone, said flow-establishing means including (a) a generally horizontal baffle near the horizontal axis of the container dividing the interior thereof into said upper and lower zones, one end of said baffle being closely adjacent said one end of said container and the other end of said baffle providing means openly interconnecting the other ends of said zones and providing for downward flow of said part of said flow from the other end or said treating zone to the other end of said settling zone, (b) an inlet pipe at said one end of said container communicating with the corresponding end of said upper zone, (c) means for delivering the emulsion to be treated to said inlet pipe, (d) an outlet pipe for separated liquid opening on said lower zone spaced from said other end, and (e) means for withdrawing treated oil from said other end of said upper elongated treating zone; and (f) means closer to said one end of said container than said other end thereof for conducting sludge upward from said layer thereof through said baffle into said upper zone with the fluid flowing in said lower zone toward said one end of said container comprising an oil-water mixture separating gravitationally during such flow to form a body of water in the bottom of said container and a layer of sludge thereabove but below said baffle, said sludge-conducting means including a plurality of tubes arranged transversely of said container with their lower ends opening on the layer of sludge below said baffle, each tube having an upper portion in the path of flow of said emulsion along said upper zone with at least one orifice delivering such sludge to such emulsion to mingle therewith.

13. An emulsion treater as defined in claim 12 in which each tube has an open upper end forming said orifice delivering sludge from the interior of the tube to said emulsion flow.

14. An emulsion treater including in combination:
a horizontal container of a horizontal length greater than its height; and
means for establishing a fluid flow essentially from one end of said container horizontally in a first direction to the other end through an upper elongated treating zone therein, with part of such flow returning horizontally in a reverse direction through a lower elongated settling zone with gravitational separation being effected in each of said upper and lower elongated settling zones, the returned part of said flow comprising material separating from the fluid flowing in said upper elongated treating zone, said flow-establishing means including (a) a generally horizontal baffle near the horizontal axis of the container dividing the interior thereof into said upper and lower zones, one end of said baffle being closely adjacent said one end of said container and the other end of said baffle providing means openly interconnecting the other ends of said zones and providing for downward flow of said part of said flow from the other end of said treating zone to the other end of said settling zone, (b) an inlet pipe at said one end of said container communicating with the corresponding end of said upper zone, (c) means for delivering the emulsion to be treated to said inlet pipe, (d) an outlet pipe for separated liquid opening on said lower zone spaced from said other end, and (e) means for withdrawing treated oil from said other end of said upper elongated treating zones;

(f) means closer to said one end of said container than said other end thereof for conducting sludge upward from said layer thereof through said baffle into said upper zone with the fluid flowing in said lower zone toward said one end of said container comprising an oil-water mixture separating gravitationally during such flow to form a body of water in the bottom of said container and a layer of sludge thereabove but below said baffle; and (g) flow-inducing means inducing said upward flow of said sludge, said flow-inducing means including means for mounting said baffle in said container to slope downward from said one end toward said other end with said one end of said baffle joined in fluid-tight relation with said one end of said container and with the sides of said baffle joined to the sides of said container in fluid-tight relation, said baffle thus dividing the interior of said container into an upper zone diverging toward said other end of said container and a lower zone diverging toward said one end of said container.

15. An emulsion treater including in combination:

a horizontal container of a horizontal length greater than its height; and means for establishing a fluid flow essentially from one end of said container horizontally in a first direction to the other end through an upper elongated treating zone therein, with part of such flow returning horizontally in a reverse direction through a lower elongated settling zone with gravitational separation being effected in each of said upper and lower elongated settling zones, the returned part of said flow comprising material separating from the fluid flowing in said upper elongated treating zone, said flow-establishing means including (a) a generally horizontal baffle near the horizontal axis of the container dividing the interior thereof into said upper and lower zones, one end of said baffle being closely adjacent said one end of said container and the other end of said baffle providing means openly interconnecting the other ends of said zones and providing for downward flow of said part of said flow from the other end of said treating zone to the other end of said settling zone, (b) an inlet pipe at said one end of said container communicating with the corresponding end of said upper zone, (c) means for delivering the emulsion to be treated to said inlet pipe, (d) an outlet pipe for separated liquid opening on said lower zone spaced from said other end; and (e) means for withdrawing treated oil from said other end of said upper elongated treating zone;

(f) means closer to said one end of said container than said other end thereof for conducting sludge upward from said layer thereof through said baffle into said upper zone with the fluid flowing in said lower zone toward said one end of said container comprising an oil-water mixture separating gravitationally during such flow to form a body of water in the bottom of said container and a layer of sludge thereabove but below said baffle; and (g) flow-inducting means inducing said upward flow of such sludge, said flow-inducing means including a heater in said lower zone heating the layer of sludge therein to effect a thermally-induced flow of such sludge upward into said upper zone.

16. An emulsion treater including in combination:

a horizontal container of a horizontal length greater than its height; and means for establishing a fluid flow essentially from one end of said container horizontally in a first direction to the other end through an upper elongated treating zone therein, with part of such flow returning horizontally in a reverse direction through a lower elongated settling zone with gravitational separation being effected in each of said upper and lower elongated settling zones, the returned part of said flow comprising material separating from the fluid flowing in said upper elongated treating zone, said flow-establishing means including (a) a generally horizontal baffle near the horizontal axis of the container dividing the interior thereof into said upper and lower zones, one end of said baffle being closely adjacent said one end of said container and the other end of said baffle providing means openly interconnecting the other ends of said zones and providing for downward flow of said part of said flow from the other end of said treating zone to the other end of said settling zone, (b) an inlet pipe at said one end of said container communicating with the corresponding end of said upper zone, (c) means for delivering the emulsion to be treated to said inlet pipe, (d) an outlet pipe for separated liquid opening on said lower zone spaced from said other end; and (e) means for withdrawing treated oil from said other end of said upper elongated treating zone, (f) said interconnecting means at said other end of said baffle including means for water washing said part of said flow by conducting same downward at least to an interfacial zone between a body of water and a layer of sludge in the body of said container below said baffle.

17. An emulsion treater as defined in claim 16 in which said other end of said baffle terminates short of said other end of said container to provide said interconnecting means connecting the other ends of said zones, and in which said water-washing means includes a wall extending downward from said other end of said baffle to a position below the level of said interfacial zone.

18. An emulsion treater including in combination:

a horizontal container of a horizontal length greater than its height; and means for establishing a fluid flow essentially from one end of said container horizontally in a first direction to the other end through an upper elongated treating zone therein, with part of such flow returning horizontally in a reverse direction through a lower elongated settling zone with gravitational separation being effected in each of said upper and lower elongated settling zones, the returned part of said flow comprising material separating from the fluid flowing in said upper elongated treating zone, said flow-establishing means including (a) a generally horizontal baffle near the horizontal axis of the container dividing the interior thereof into said upper and lower zones, one end of said baffle being closely adjacent said one end of said container and the other end of said baffle providing means openly interconnecting the other ends of said zones and providing for downward flow of said part of said flow from the other end of said treating zone to the other end of said settling zone, (b) an inlet pipe at said one end of said container communicating with the corresponding end of said upper zone, (c) means for delivering the emulsion to be treated to said inlet pipe, (d) an outlet pipe for separated liquid opening on said lower zone spaced from said other end; and (e) means for withdrawing treated oil from said other end of said upper elongated treating zone, (f) said baffle sloping downwardly from said one end of said container toward the other end thereof to dispose said interconnecting means lower than the elevation of said one end of said baffle.

19. An emulsion treater as defined in claim 18 including pipe means extending longitudinally of said container immediately above said baffle with baffle-washing nozzles directed along the upper surfaces of said baffle, and means for delivering a wash liquid under pressure to said pipe means to flush from the inclined baffle and through the interconnecting means at said other end thereof any solids contained in the emulsion and separating therefrom in said upper zone.

20. An emulsion treater as defined in claim 19 in which said pipe means is near the inner periphery of said container, and in which at least some of said nozzles are inclined in a direction toward the vertical midplane of the container and toward said other end of said baffle.

References Cited

UNITED STATES PATENTS

| | | | |
|---|---|---|---|
| 1,480,064 | 1/1924 | Harris | 204—302X |
| 1,838,849 | 12/1931 | Lawrason | 204—304X |
| 2,375,590 | 5/1945 | Schonberg et al. | 204—302X |
| 3,269,931 | 8/1966 | Darby et al. | 204—302X |

JOHN H. MACK, Primary Examiner

D. R. VALENTINE, Assistant Examiner

U.S. Cl. X.R.

204—284